UNITED STATES PATENT OFFICE.

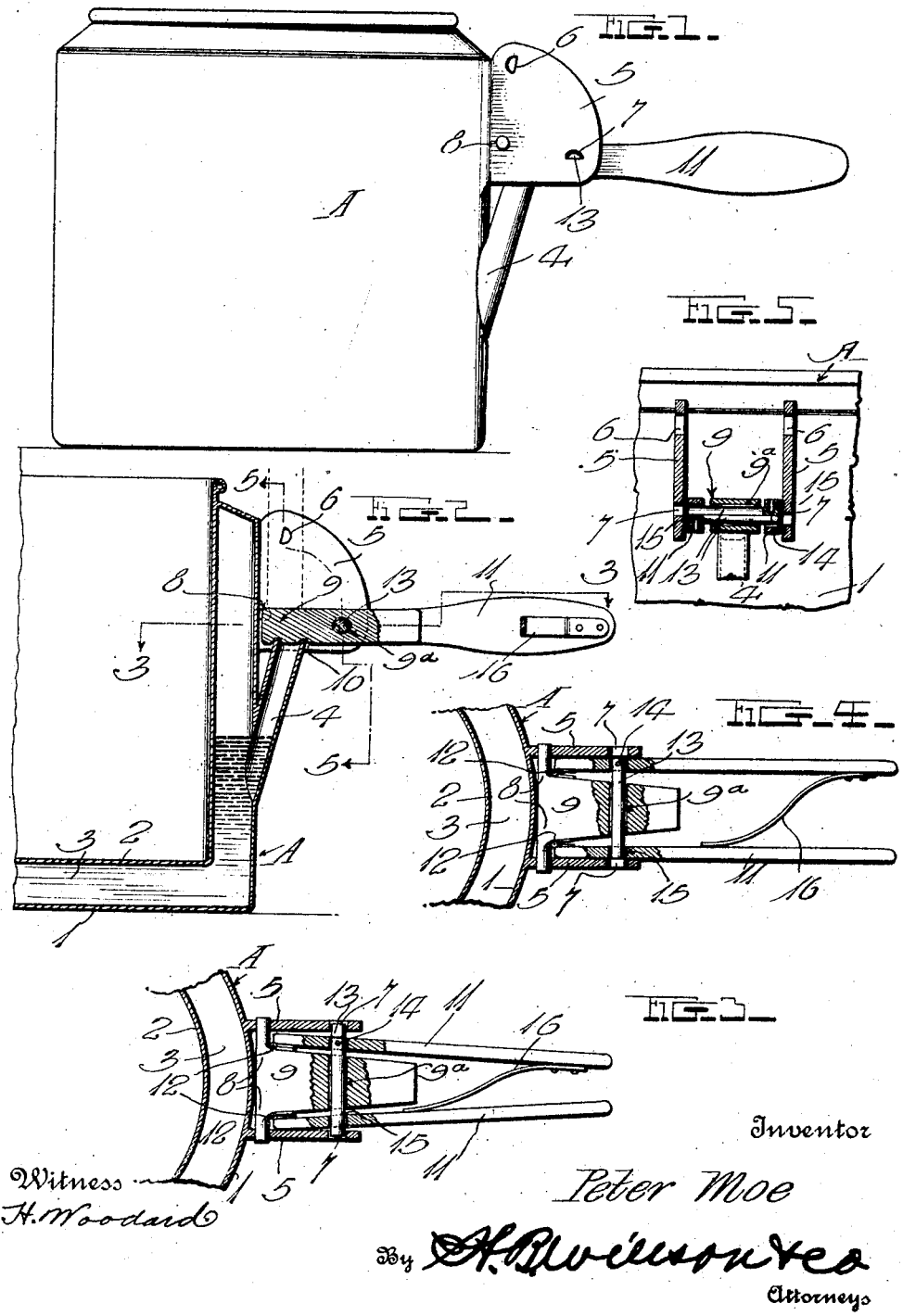

PETER MOE, OF SEATTLE, WASHINGTON.

COOKING UTENSIL.

1,380,302.   Specification of Letters Patent.   Patented May 31, 1921.

Application filed April 15, 1920. Serial No. 374,118.

*To all whom it may concern:*

Be it known that I, PETER MOE, a citizen of the Kingdom of Norway, residing at Seattle, in the county of King and State of Washington, have invented certain new and useful Improvements in Cooking Utensils; and I do declare the following to be a full, clear, and exact description of the invention, such as will enable others skilled in the art to which it appertains to make and use the same.

This invention relates to improvements in cooking utensils.

The primary object of the invention is to provide a cooking utensil which includes a filling spout and a handle, the latter which is of such construction that it serves as a means for closing the spout, and also serves as the carrying means for the utensil.

Another object of the invention is to provide a cooking utensil of the above mentioned type in which the handle is provided with means for retaining it in either a horizontal or vertical position. When it is in horizontal position it serves as a closure for the spout of the utensil, the handle itself being of such construction that it may be readily moved from its horizontal spout closing position to its vertical spout opening position by merely lifting it, the retaining means being effective when the handle sections thereof are moved toward one another.

A further object of the invention is to provide a cooking utensil which is equipped with a novel handle including sections movable toward and from each other, each section carrying a pin which is projectable through openings formed in a part of the utensil when the sections are compressed, this construction serving to prevent pivotal movement of the handles, that is, when the sections are gripped and compressed.

Other objects and advantages of the invention will be apparent during the course of the following description.

In the accompanying drawings forming a part of this specification and in which like numerals are employed to designate like parts throughout the same, Figure 1 is a side elevation of a utensil constructed in accordance with my invention.

Fig. 2 is a central vertical section thereof.

Fig. 3 is a horizontal section on the plane of the line 3—3 of Fig. 2, the handle being shown in spout closing position.

Fig. 4 is a view like Fig. 3 showing the handles in a position which they assume preparatory to the movement from their horizontal position to their vertical position.

Fig. 5 is a section on the plane of the line 5—5 of Fig. 2.

In carrying out my invention I employ a container or receptacle which has some similarity to a chafing-dish pan, that is, a container provided with spaced walls between which water is placed and boiled. The outer wall of the utensil is provided with an outlet and is also equipped with a handle which is movable from horizontal position to a vertical position, which serves as a means for closing the outlet, and also serves as a means for carrying a container.

Referring more specifically to the drawings, it will be seen that the container A includes an outer wall 1, and an inner wall 2, between which a water space 3 is formed. Water is supplied to the space 3 between the walls by means of an outlet which communicates with the space through the wall 1. The outlet in this instance is preferably in the form of a spout 4, and the upper open end of this spout is disposed between the lower portions of a pair of spaced ears 5 carried by the container. Ears 5 are provided with upper and lower openings 6 and 7, the purposes of which are hereinafter to be set forth. Pivotally connected to the ears 5, as indicated at 8, is a spout closing member designated by the numeral 9, this member being here shown in the form of a substantially rectangular block. Member 9 is preferably disposed adjacent the upper open end of the spout 4 and its under face is provided with a groove 10 which fits the upper edge of the spout and makes a tight joint between these parts. This spout closing member is in effect a valve, and it is actuated by means of a pair of handles or handle-sections 11 which are pivotally connected or hinged, as indicated at 12, on opposite sides of said member. These handles have two main positions as shown in Fig. 2, one of the positions being horizontal and the other position being vertical, and when they are in horizontal position it will be seen that the spout closing member 9 will be in a position to close the spout, and when they are in their vertical position the spout closing member 9 will be lifted and the spout will be open.

In order to permit the container to be filled with water, it will be found advisable to employ means to retain the handles in a vertical position. This retaining means may be of any desired construction. However, to accomplish this, I employ a pair of pins 13 which, when the handle is gripped in either horizontal or vertical position, will be projected into the openings 6 or 7 and the handle is held rigidly in upright position. By gripping handle sections when in horizontal or spout closing position, the pins 13 are forced into openings 7 and relieve groove 10 of the weight of the utensil when carried. By releasing the handle sections, the spout is closed by the handle descending to horizontal position. The spring 16 serves to keep the handle bars apart and pins 13 from engaging the openings 6 and 7 in moving the handles up and down. Before proceeding to describe the function of this spring further, it is thought that a description of the pins 13 and their operation and function should be set forth. To this end it will be seen by referring to the drawings that there are two of such pins and each is adapted to slide freely through a transverse hole 9ª in the spout closing member 9. As shown more particularly in Figs. 2 and 5, these pins 13 are substantially semi-cylindrical in shape and each one is rigidly connected to one of the handles 11 by a pin 14, and the pin on one handle is adapted to be projected through the opening 15 in the other handle and thence through the openings 6 or 7 in the ears 5, and vice-versa, so as to retain the handle in locked position. Assuming for instance that the handles are in locked position as shown in Fig. 3, it will be seen that in order to release them, it will be necessary only for the operator to release his hold on the handle section, whereupon the action of the spring 16 will automatically force the handle sections apart and in turn withdraw the pins 13 from the openings 7 leaving the handle free to be moved to its vertical position by raising it without gripping the handle. While I have described the handles 11 as being held in locked positions by means of semi-cylindrical pins which move into and out of openings in the ears 5, I desire it to be understood that any other means may be employed to serve this purpose.

A cooking utensil as shown has some similarity to a chafing-dish and it is particularly designed to cook cereals in, although it may well serve many other uses. The material of which the utensil is made is not important. When the device is not in use the handles will be in horizontal position. When water is to be placed in the outside container, the handles are simply raised to their vertical position and the handle bars are then pressed toward each other thereby driving pins 13 into holes 6, when handle is locked and held rigidly, thereby facilitating the operation of filling the outside container through spout 4. After water has been placed in the container the operator releases his hold on the handles which, through the action of spring 16, are automatically forced apart withdrawing pins 13 from holes 6 and permitting the handle to come down to its spout closing position.

When in this position, the spout closing member 9 will fit tightly against the upper end of the spout and as it will be seen that when the inside container is filled with a liquid composed mostly of water, the temperature of the two containers will equalize through the metal wall 2 and equalize the pressure of steam in the two containers so that the pressure in the outside container will not be sufficient to raise the handle. By this indirect evaporation, it is possible to have the contents of the inner container reach the boiling point in less time and prevent scorching of the food in the inner container. In event of excessive dryness of the contents of the inner container, the excess heat in the outer container will escape through the filling spout.

A device of the above construction will be found extremely useful as a household appliance, as it will serve to keep the food within the container warm even after it has been taken off of the fire because of the fact that when the handles 11 are in horizontal position the member 9 will prevent possible escaping of the steam from the water space 3. The handles 11 not only serve as a means for closing the spout 4, but they also serve to permit the container A to be carried in the usual manner.

From the foregoing description taken in connection with the accompanying drawings, it is believed that the use and main advantage of my device are obvious, and it is therefore believed that further description is unnecessary.

It is to be understood that the form of my invention herein shown and described is to be taken as a preferred form of the same and that minor changes, in the shape, size, and arrangement of parts may be resorted to without departing from the spirit of the invention or the scope of the subjoined claims.

I claim:

1. A device of the character set forth comprising a container having an outlet, and a handle movable from a horizontal position to a vertical position and adapted to serve as a closure for the outlet when in one of said positions.

2. A device of the character set forth comprising a container having an outlet, a handle movable from a horizontal position to a vertical position and adapted to serve as a closure for the outlet, and co-acting means between the container and the handle to retain the latter in closing position.

3. A structure as specified in claim 2, the co-acting means between the handle and the container serving to retain the handle in either its horizontal or vertical position.

4. A structure as specified in claim 2, the co-acting means between the handle of the container being in the form of retractable locking pins.

5. A device of the character set forth comprising a container including a spout, a handle pivotally secured to said container adjacent the spout and adapted to be swung down over the open end of the spout to close the same.

6. A device of the class specified comprising a receptacle including a spout, a handle pivotally connected to the receptacle adjacent the spout and adapted to bear on the upper open end of said spout and serve as a closure therefor, said handle including movable sections, and means carried by, and interposed between the sections to hold them in a set position, said means being active when the handle sections are compressed.

7. A device of the class specified comprising a receptacle including a spout and a pair of spaced ears having alined openings, a closing member for said spout carried by the receptacle, a pair of handles carried by and disposed on opposite sides of the closing member, and means associated with the handles and projectable into the openings in the ears to retain the handles in a set position.

8. The structure specified in claim 7, the retaining means for the handles being projectable pins carried by the handles.

9. A device of the class described comprising a container having a pair of spaced ears provided with alined openings, a pair of spaced handles pivotally secured to said container and disposed between the ears, each handle being provided with a hole, a locking pin carried by each handle, the locking pin on each handle being projectable through the hole in the other handle and into one of the openings in one of the ears to retain the handles in a set position.

10. A device of the class specified comprising a container equipped with spaced ears having openings, a spout carried by the container and having its open end disposed between the lower portions of the ears, a spout closing member pivotally connected to the container between the ears and having a transverse hole extending therethrough, a pair of handles hingedly connected on opposite sides of the spout closing member, each handle having a hole registering with the transverse hole in the spout closing member, a locking pin carried by each handle and slidable through the opening in the spout closing member, the locking pin carried by one handle being projectable through the hole in the other handle and into one of the openings in one of the ears, and vice versa, to retain the handles in locked position.

11. A device of the class specified comprising a receptacle including a spout, a combined handle and spout closing member pivotally connected to the receptacle adjacent to and adapted to bear on the upper open end of said spout, and means carried by the handle and engageable with a part of the receptacle to prevent pivotal movement of the former, such movement being permitted when the handles are ungripped.

In testimony whereof I have hereunto set my hand.

PETER MOE.